April 17, 1962     R. D. BULLARD     3,030,155

SLIDE BEARINGS

Filed June 19, 1959

INVENTOR.
ROBINSON D. BULLARD

United States Patent Office 3,030,155
Patented Apr. 17, 1962

3,030,155
SLIDE BEARINGS
Robinson D. Bullard, Springfield, Vt.
(Perkinsville P.O., Weathersfield, Vt.)
Filed June 19, 1959, Ser. No. 821,498
5 Claims. (Cl. 308—3)

The present invention relates to slide bearings, and particularly to a new and improved wear take-up device for maintaining an accurate relationship between a support and a slide bearing cooperating therewith. The invention not only has application as a wear take-up device, but also is adapted to serve as a binding device for locking two relatively slidable members together.

Tapered gibs for compensating for the wear between two relatively movable slide bearings are old. They are designed to be forced between two members that are adapted to slide relatively to each other for the purpose of maintaining a proper sliding fit between the two members. Usually, one side of the tapered gib acts as a slide bearing and the opposite side thereof mates with a correspondingly tapered surface on the member that supports the member for relative sliding movement.

Bearing gibs of the above described type must be adjusted from time to time for wear take-up, and are not suitable to effect actual binding of the two relatively slidable members together.

Binding devices for locking two relatively movable slide members together are well known, and usually employ force multiplying mechanical linkages for producing the necessary high frictional forces between the two relatively slidable members.

One of the principal objects of this invention is to provide a bearing gib that will at all times be effective to maintain a predetermined slide bearing clearance without requiring adjustments from time to time to compensate for wear.

Another object of this invention is to provide a binding device that can effectively and positively lock two relatively slidable members together without requiring an operating mechanical force multiplying linkage to initiate the locking action.

Another object of this invention is to provide a combined wear take-up gib and binding device without requiring an operating mechanical force multiplying linkage to initiate the locking action.

These and other objects of the invention are achieved by providing a device having a gib-like member interposed between surfaces of two relatively slidable members. The gib-like member may be tapered or it may possess parallel sides. One of the sides of the gib may form a slide bearing or friction bearing surface for the opposing surface of one of said members, whereas another of the sides of the gib may be disposed adjacent the substantially parallel reaction surface of the other of said members. A recess formed between the said substantially parallel surfaces accommodates a flexible or resilient sealing ring therein of the type commonly referred to as an O-ring, and a passage connected to a source of fluid under pressure may communicate with the interior of said sealing ring. By introducing fluid under a predetermined pressure through said passage to the interior of the sealing ring, a predetermined pressure will be exerted between the relatively parallel surfaces, tending to force the gib into frictional engagement with the adjacent surface of one of the relatively slidable members. This makes it possible to maintain a desired amount of clearance between the two relatively slidable members for accurate sliding action and, if the pressure is sufficiently increased, to obtain a rigid locking or binding action between the two relatively slidable members.

For a complete understanding of the present invention, reference may be made to the detailed description which follows and the accompanying drawing in which.

Figure 3:
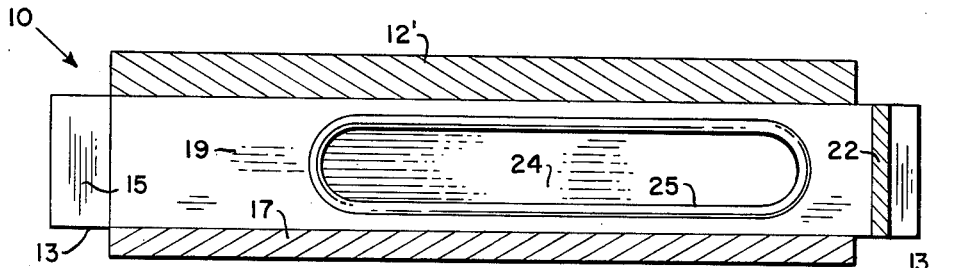
FIGURE 3 is a sectional view taken substantially along the line 3—3 of FIGURE 1, looking in the direction of the arrows.
Figure 1:
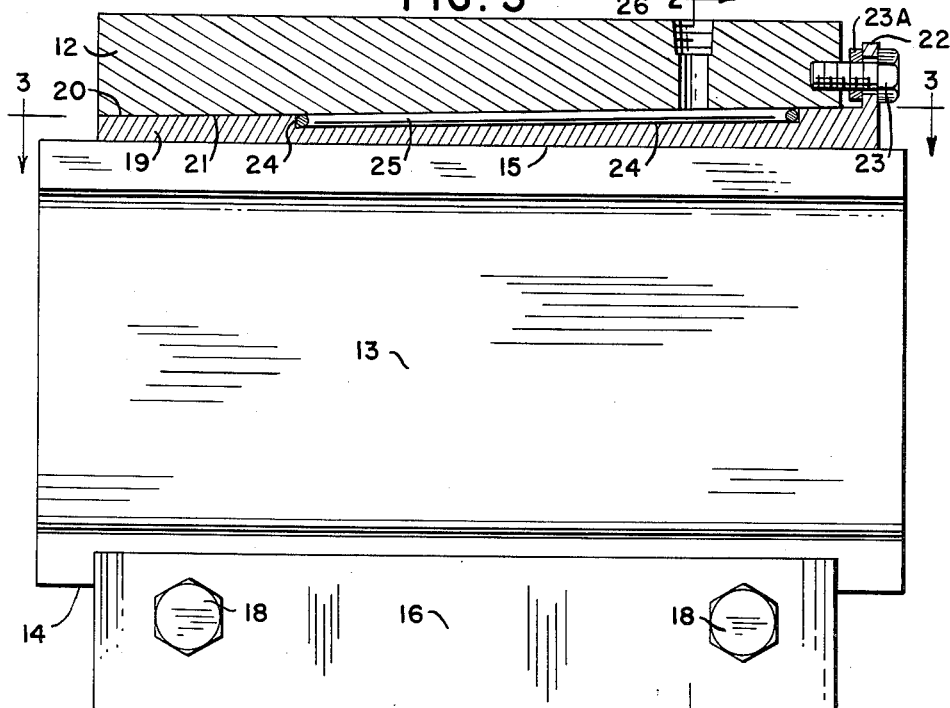
FIGURE 1 is a front elevational view, partly in section, of a slide bearing embodying the present invention.
Figure 2:
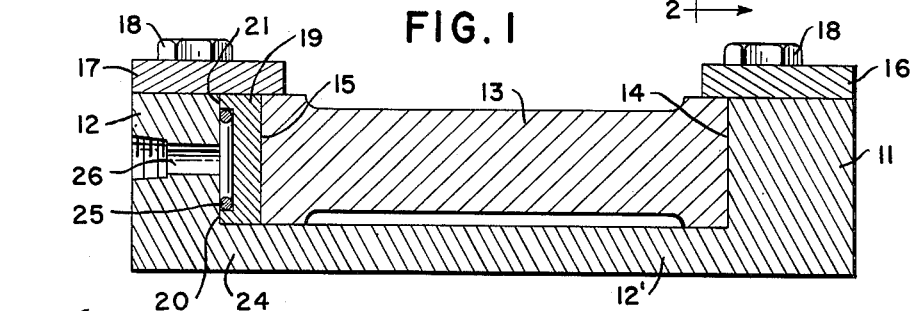
FIGURE 2 is a sectional view taken substantially along the line 2—2 of FIGURE 1, looking in the direction of the arrows.

Referring to the drawing, and particularly to FIGURE 2, the invention is shown as applied to a slide bearing including a member 10 that may be stationarily mounted. The member 10 may include two oppositely disposed portions 11 and 12 joined by an integral wall 12', and between which portions may be mounted a slide member 13, which latter may be reciprocated relatively to the stationary member 10 by suitable means (not shown). The member 13 may be provided with opposed, parallel sliding surfaces 14 and 15, and retaining strips 16 and 17 may be fixed to the portions 11 and 12 by cap screws 18 or the like to retain the member 13 in place between the portions 11 and 12.

A gib 19 may be located between the surface 15 of member 13, and a surface 20 of the portion 12. The gib may be tapered, in which case its surface 21 mates with and is substantially parallel to the corresponding tapered reaction surface 20 of the portion 12. In the embodiment shown, a tapered gib is disclosed, since it is desired to indicate the applicability of the present invention to existing tapered gib structures. The gib 19 is provided with a lip 22 containing a slightly enlarged hole or slot through which a cap screw 23 extends. The screw 23 is threaded into the end of the portion 12 and the gib can be adjusted lengthwise relative to the stationary member 10 by the adjustment of the screw. A nut 23a serves to lock the gib in adjusted position against longitudinal movement.

A recess 24 may be formed in the surface 21 of gib 19, and a distortable sealing ring 25, for example, a conventional O-ring made of flexible or resilient material, may be accommodated within said recess. The recess 24 is shown wholly within the surface 21 of gib 19, although it may be totally within the reaction surface 20 of portion 12. A conduit 26 may lead from the exterior of member 10 through the portion 12 thereof and may open into the recess 24 within the periphery of the O-ring 25. The end of the conduit 26 is threaded to permit the end of a pressure conduit from a fluid system (not shown) to be coupled thereto.

Fluid is adapted to be supplied to the conduit 26 by the fluid system under any predetermined pressure for causing the apparatus to act either as a wear take-up device to insure accurate slide bearing action between the members 10 and 13, or as a positive but releasable binding device to prevent relative sliding between the members 10 and 13. A fluid pressure system having a variable output up to 500 p.s.i. may, for example, be suitable to carry out the principles of this invention. The pressure within the recess distorts the O-ring so that the latter forms a tight, leak-proof seal between the surfaces 20, 21, notwithstanding the fact that they may be urged apart by the pressure. As the clearance between the surfaces 20, 21 increases, this clearance is taken up completely by the distortion of the O-ring.

The invention has been shown in preferred form and by way of example only, and obviously many variations and modifications may be made therein without departing from the spirit of the invention. The invention, therefore, is not to be limited to any specified form or embodiment, except insofar as such limitations are set forth in the claims.

What is claimed is:

1. A slide bearing comprising a pair of relatively slidable members; a bearing gib between said members; means for aixally adjusting said gib; means defining a recess between said gib and one of said members; a single distortable sealing ring within said recess; and means for directing fluid under pressure to said recess within the periphery of said sealing ring to urge the gib against the other of said members, the distortion of the sealing ring by said fluid under pressure retaining the fluid confined within the sealing ring, notwithstanding the development of clearance between the gib and the said member.

2. A combined slide bearing wear take-up device and binding device comprising a stationary supporting structure having a guiding surface and a reaction surface spaced apart from each other; a movable slide supported by said supporting structure between said guiding and reaction surfaces; an axially movable gib interposed between said slide and said reaction surface of the supporting structure; means defining a recess between said gib and said reaction surface, the reaction surface and the opposed surface of the gib being substantially parallel outside the boundary of the recess; a single distortable sealing ring within the recess at the outer boundary thereof; and means for directing a fluid under pressure to said recess and within said sealing ring, establishing pressure between the reaction surface of the supporting structure and the opposite substantially parallel surface of the gib to urge the gib against the slide, said fluid under pressure forcing the sealing ring against the outer extremity of the recess so as to distort the sealing ring and prevent the escape of fluid from the recess notwithstanding the development of clearance between the said substantially parallel surfaces.

3. A slide bearing comprising a movable slide; extended guide means for said movable slide, said slide having at least one edge parallel to said guide means; means defining a reaction surface spaced apart from another side of said movable slide; displaceable gib means interposed between said edge of the movable slide and said reaction surface; means defining a recess between the said reaction surface and the adjacent surface of the gib, said adjacent surface of the gib being substantially parallel to the reaction surface outside the boundary of the recess; a single sealing ring accommodated within said recess at the outer boundary of said recess; and means defining a passage which communicates with said recess and the interior of said sealing ring for conducting a fluid under pressure to said recess to urge the displaceable gib means against the corresponding edge of said movable slide at the desired pressure.

4. A slide bearing as set forth in claim 3 wherein said displaceable gib means is wedge-shaped and said reaction surface is tapered, and including means for adjustably sliding said parallel surfaces relative to each other to permit the displaceable gib means to be adjusted toward or away from the corresponding side of the movable slide.

5. A slide bearing comprising a first stationary member; an element mounted for sliding motion relatively to said first stationary member; a second stationary member between said first stationary member and said sliding element; a recess in one of the opposed surfaces of said stationary members; a flexible O-ring within said recess and adapted to form a fluid seal between said recess and the space between said opposed faces of said stationary members: and means for conveying fluid under pressure to said recess within the confines of said O-ring.

References Cited in the file of this patent
UNITED STATES PATENTS

| | | |
|---|---|---|
| 1,169,206 | Sydney | Jan. 25, 1916 |
| 2,440,919 | Shaw | May 4, 1948 |
| 2,768,406 | Carle | Oct. 30, 1956 |